Patented Dec. 3, 1929

1,738,246

UNITED STATES PATENT OFFICE

ROBERT W. HOLT, OF CHICAGO, ILLINOIS, ASSIGNOR TO FUSION WELDING CORPORATION, OF CHICAGO, ILLINOIS, A CORPORATION OF ILLINOIS

CUTTING ELECTRODE

No Drawing.     Application filed October 11, 1926.  Serial No. 141,034.

This invention relates primarily to the cutting of metals by means of an electric metallic arc maintained between a cutting electrode and the metal being cut.

Cutting has generally been practiced with an arc by using carbon as the cutting electrode. This method does not permit making smooth cuts such as, for example, are obtainable with the oxygen cutting torch, because the current carrying capacity of carbon is so low that a relatively large diameter electrode is required to carry the current necessary for cutting. The large diameter in turn spreads out the arc so that a wide and more or less irregular cut is the result.

The principal object of my invention is to provide an improved cutting electrode which is capable of producing a narrow regular cut at a high rate of speed.

While the foregoing statement is indicative in a general way of the nature of my invention, other objects and advantages will be apparent to those skilled in the art upon a full understanding of the improved electrode.

By substituting a metal for the carbon electrode, greater arc concentration is possible because of the greater current carrying capacity of metals. If in addition a coating is applied to the metal electrode of such a nature that it produces a very high resistance arc vapor, still more energy is converted to heat in the arc. Metallic electrodes as a rule readily melt in the arc and consequently add metal to that which it is desired to cut away. If a second coating is applied to the electrode over the one giving the high vapor resistance, such second coating being of a nature as to remain more or less intact for at least a short interval after the metal electrode inside has melted, a crater is formed in the end. The expanding gases inside this crater blow not only the melted electrode metal, but also the metal being cut, as fast as it is fused, out of the arc zone, thus always allowing the arc to play on fresh metal.

The end of a cutting electrode of this improved type can be plunged under the metal without extinguishing the arc, which continues to play inside the crater. Such an electrode cuts very fast and quite smooth, and, while the electrodes are consumed, they cost no more in general than oxygen gas, and at the same time cut so much faster than the carbon arc that the cost of labor is reduced. In addition, they offer an advantage to the metallic arc welder who must also do some comparatively smooth cutting through obviating the necessity of possessing and maintaining oxygen cutting equipment.

While my cutting electrode can be made in a number of ways without deviating from the general principles which involve a metallic electrode so coated either with one layer or two or more layers of material such that a high resistance arc vapor is formed and also a crater, I prefer at least for general cutting of mild steel to use the following materials: A mild steel electrode coated with a layer of aluminum oxide giving the high resistance arc and then with a layer of silicon dioxide to form the crater, any suitable binder such as silicate of soda being employed. The voltage drop through the arc from such an electrode is approximately double that of a welding electrode of the same size and metallic composition held at the same arc length, and consequently I am able to release twice the heat in the same arc. The crater effect not only results in blowing the metal as fast as fused out of the arc zone, but also tends to concentrate the arc, which means greater heat concentration.

While my electrode probably is of maximum use in the cutting of metals, still it also can be used for welding by simply changing the amount of current used and the manipulation by the operator. It is especially suited for welding heavy sections without the necessity of beveling the edges or of applying multiple layers. One of my electrodes $\tfrac{3}{16}$ inch diameter and using 325 amperes current will readily weld ½ inch mild steel plates simply butted together clear through with one passage of arc over the work. Heretofore ¼ inch plate has generally been considered the limit of thickness.

In coating the electrodes with more than one layer coatings, such coatings may be of the same or of different materials, but if of the same material the purpose of multiple layer coating is to control more readily the thickness than is possible by altering the consistency of the coating dip.

I claim:

1. A metallic arc electrode having an inner coating of aluminum oxide in combination with a surrounding coating of silicon dioxide.

2. A metallic arc electrode having an inner coating of an aluminum oxide material in combination with a surrounding coating of a silicon dioxide material.

3. A metallic arc electrode having an inner coating of a material containing compounds of aluminum and oxygen which tends to increase the voltage drop across the arc in combination with an outer surrounding coating of a material containing compounds of silicon and oxygen which tends to form a crater.

In testimony whereof I have hereunto subscribed my name.

ROBERT W. HOLT.